NO PRINTED SPECIFICATIONS AVAILABLE
666
2 Sheets—Sheet 1.
W. B. Leonard.
Recd 12/17/69
7161X
Drawing Frame for Spinning Mach.
Patented Sept. 16, 1833.
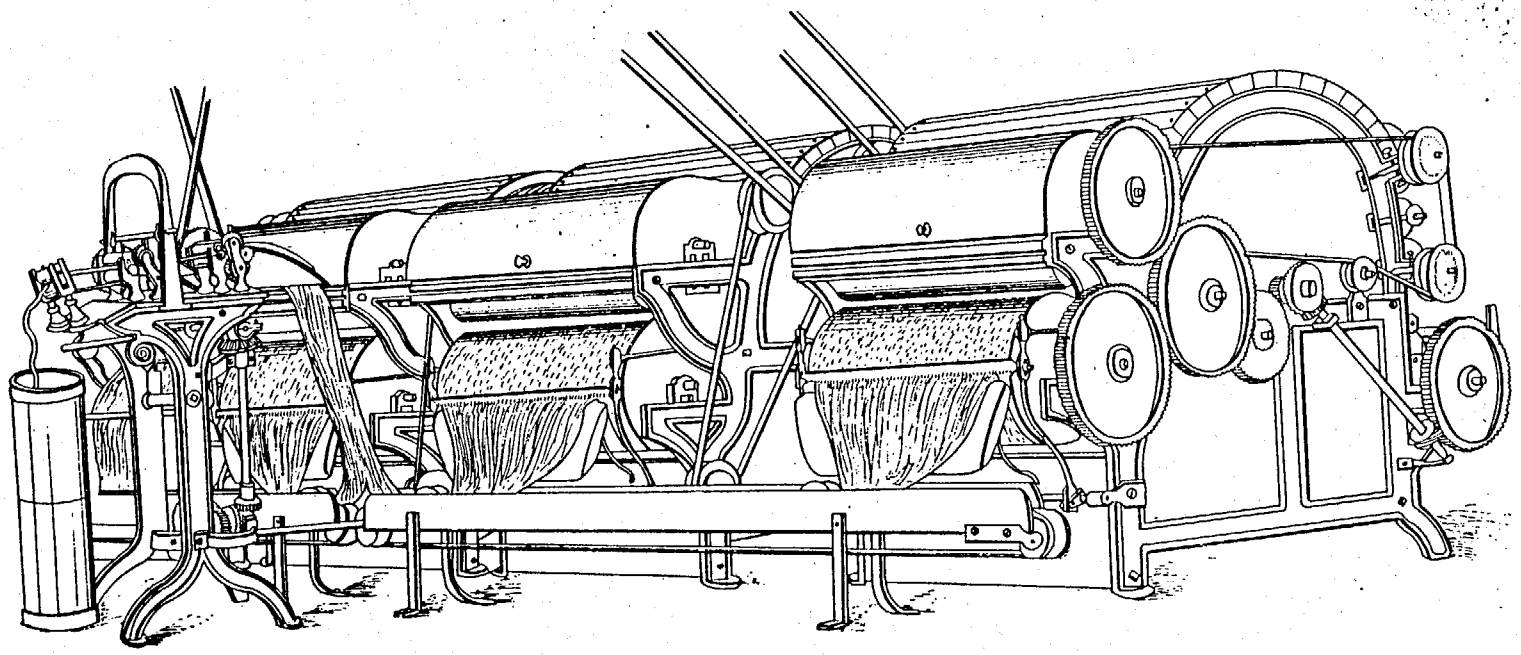
PROPERTY OF
ENGINEERING
LIBRARY****
PLATT SACO
LOWELL
CORPORATION
N. PETERS, PHOTO-LITHOGRAPHER, WASHINGTON, D. C.

2. Sheets
Sheet 2.
W. B. Leonard,
Draming Frame for Spinning Mach
Patented Sep. 16, 1833.
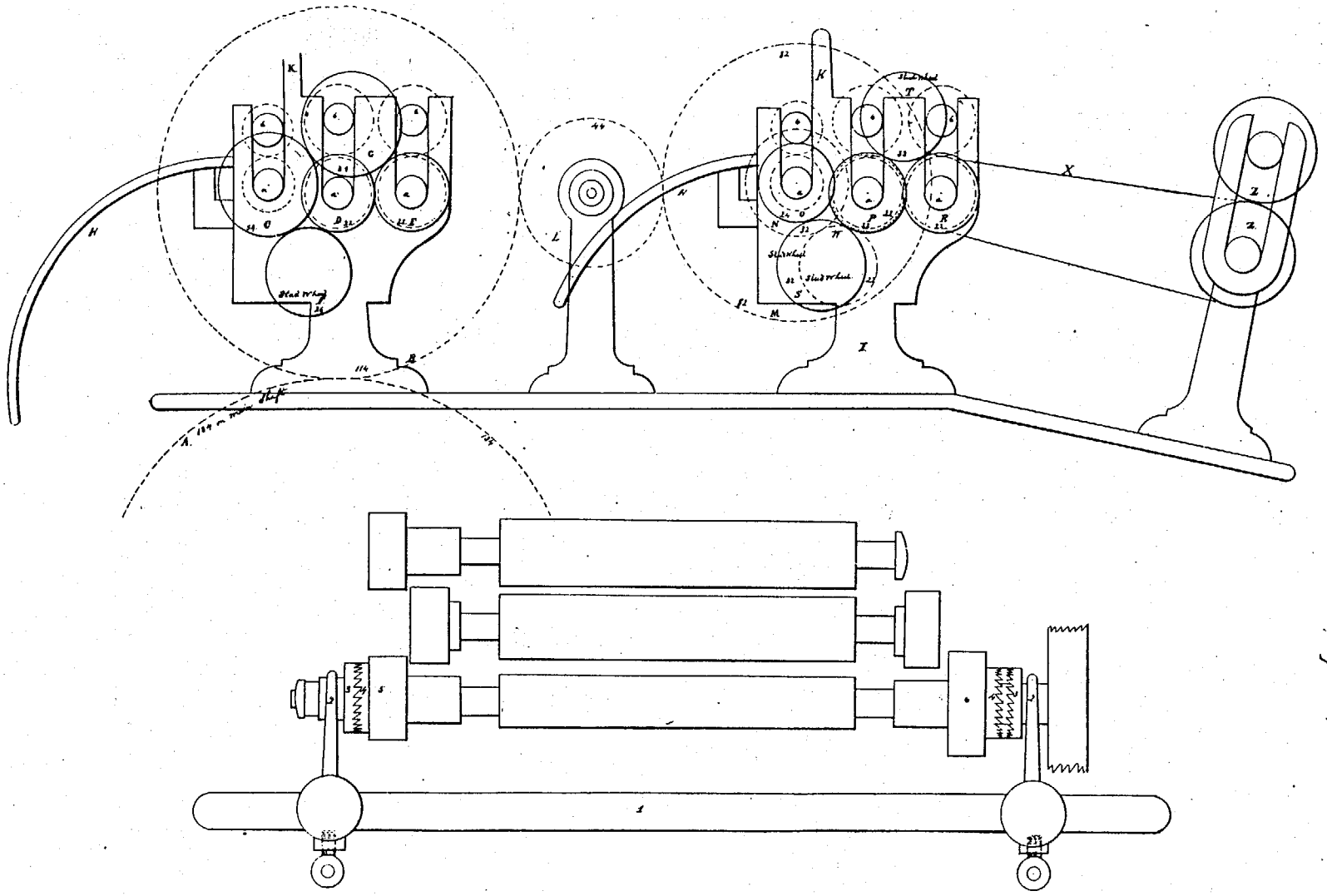
N. PETERS, PHOTO-LITHOGRAPHER, WASHINGTON, D. C.

X 7761

William B. Leonard.

The Schedule referred to in these Letters Patent and making part of the same, containing a description in the words of the said William B. Leonard himself of his Improvement in the machinery for drawing Cotton. called Leonards improved rail way Drawing head —

To all persons to whom these presents may come: I William B. Leonard of Fishkill, in Dutchess County in the State of New York send Greeting. —

Be it known that I the said Leonard have invented constructed & applied to use a new & useful improvement in the machinery for drawing cotton, called Leonards improved rail.way drawing head, specified in the words following (viz) Note — In the following description of this machine the end upon, or into which the cotton enters is called the back end - and the end upon which the delivering rollers are placed or where the cotton leaves the machine is called the front end - And the side on which the driving pulleys are placed, is called the pulley side & the opposite is called the gear side — -

This machine consists of a frame formed by two iron posts three and an half inches wide & half an inch thick flanged on each side & are supported by a cross girth seven inches wide & three quarters of an inch thick, with projections extending from the sides at each end, the whole width of the posts thro' which it is bolted to them. —

This girth between the faces of the flanges is eighteen inches long. At the height of two feet & five inches these posts receive a round wrought iron cross bar one & a quarter inch in diameter with shoulders eighteen inches apart, & outside of the shoulders it is turned smaller & formed into a screw which passes thro' the posts & is held firmly to them by a nut on the outside. —

Below the girths the posts are divided & turned backwards & forwards with a double curve until they expand eighteen inches & turn downwards seven & a half inches where they are cast with feet to rest upon, & be secured to the floor of the mill -

Above the rod the posts again divide & are turned backwards & forwards with a single curve until they are perpendicular to the feet. — a part of the flange of the front division of the posts are turned downwards & for ornament are formed into a scroll on the under side - a top piece joins & connects these divisions of the posts, forming a level or right angle with the posts & is three feet & two inches high from the feet - This piece is contin-ued level from the back end forwards fourteen & a half inches, where it inclines downwards in an angle of ten degrees, three & a half inches, the flanges of this top piece with juttings & curves to those of the posts to give it beauty & taste.

Between the division of the posts & the top piece is an opening in form approaching an equilateral triangle whose sides are four inches on the top pieces at right angles with the part which is level, & at the distance of one foot from the back end a piece is raised ten & a half inches, it stands flush with the flange of the top piece on the outside is as thick as the top piece & joins it with a pedestal, eight & a quarter inches from the top piece it has a hole for a sliding rod round which it is a little swelled to preserve its strength & it is surmounted with a capital to receive the foot of an arched piece to join them, it is one & a half inch wide at the pedestal & one & a quarter at the top -

These several parts are called pieces, but are to be considered as forming one entire piece of casting, & side of the frame, & when the girth & cross piece are bolted to them, will form a frame eighteen inches wide on the inside, & at the feet & top, eighteen & a half inches long, & three feet & two inches high.

The top of the frame is surmounted with a piece of casting one half an inch thick extending across the frame, & from the back end to the vertex of the angle before described, & is cut on the edges to receive the upright pieces & comes flush with the flanges of the top piece, & is rounded on the edge to appear like a moulding upon it - a flange is cast upon it on the under side to joint with the insides of the top pieces thro' which it is bolted to them -

Another plate of similar thickness extends across the front end of the frame, forming a perfect joint with the first in the angle & extending forwards to the front of the frame, where it is projected forwards with a double curve, three & a half inches & inwards five inches on each side, where the curves turn backwards with a radii of one & three quarter inch, & are joined with a curve whose radii is three inches, & is formed

X7761 with its centre forwards thus forming the projections for the stands of the delivering rollers with a curved space for the sliver to descend to the cans - The whole top surface of these plates are finished smooth & polished. The frame & plates being thus prepared, the following parts or peices are attached to them as follows - on the back side of the girth & gear side of the frame & close to the flange, a stand is bolted, projecting upwards to form the front bearing of a shaft for a pinion & bevel wheel, & at the distance inwards, from this stand, another stand is bolted to the same side of the girth projecting upwards to form the bearing for a shaft, having on it a cog wheel & drum for the rail way on the gear side of the frame, & six & three quarters of an inch from this, another similar stand is bolted for the like apparatus for the rail way on the pulley side of the frame, on the post on the gear side, just above the girth & from the outside of the post, a stand is projected backwards & at the distance of four inches from the post it is turned inwards & forms the bearing of the shaft of the pinion & bevel wheel before mentioned, & the cap which covers the bearing is bolted to the stand thro' the bearing & has on the top of it a step for an upright shaft having on each end of it a bevel wheel. On the top of the post turned back, two feet & seven inches high from the foot, a stand is projected backwards & turned inwards until it extends backwards three inches and inwards two inches, when it again turns backwards, three inches & forms a bearing for the upper end of the upright shaft directly perpendicular to its step on the cap below - From the top piece of the frame & from the inside of them & on each side of the frame, a stand is projecting backwards to form the bearings for the main shaft, they are turned under the curved parts of the posts & in line of the bearing & step for the upright shaft; & on the inside of the pulley post a stand is projected inward five inches, upon which is a stud to form the fulcrum of the lever to fasten & set free a large wheel on the main shaft by a clutch box - upon the top plate two & three quarter inches from the back edge are placed two stands with all the parts necessary for a common cotton drawing head forming the bearings for the drawing & grooves for the top rollers, the projections for keeping in place, the cleaning boards & studs projecting backwards & upwards to form a rest to keep in place a curved

X 7761 plate to form a rest & guide for the slivers as they approach the back rollers from the rail way below. These Stands rest upon feet three inches in diameter are turned with mouldings & are ten inches apart & so placed that the centre between them will be the middle of the plate measuring from the sides & they rise four & a quarter inches from the plate. on a line with the one on the gear side another Stand is raised to receive the Studs necessary for the stud wheels intermediate to those on the rollers, these stands are for the back drawing head, Similar Stands are placed on the front part of the back plate in such a manner, that the front edge of the feet of those sustaining the rollers will be in a line with the joint between the plates & the stands seven inches apart & the stud wheel Stand in the same relative position. Another Stand with a Stud for a Stud wheel is then placed between the roller Stand on the pulley side & the upright piece. A Stand is next placed near the pulley side of the plate to receive & support the stud wheel which communicates motion to the front drawing head from the back one. A Stand is then placed on each projection of the front plate forming the bearings for the lower delivering roller & the grooves for the top roller. all these Stands are firmly bolted to the plates by screws thro' them entering the centre of the feet in which the female screw is cut, a lever is placed on the stud of the Stand under the plate extending back & forming the forks to govern the clutch box & forward to the front of the plate, where the end is formed a handle to move it. a rod three fourths of an inch in diameter is passed thro' the holes in the upright pieces receiving near each inside of the uprights two stands clasping it with a socket & secured to it with a set screw, thro' the top, below the rod they project downwards & form the forks to govern the clutches, on the back roller of the front drawing head. This rod slides endways & has two notches on the upper side in such place that a latch on the outside of the upright at the pulley end, when entered into the notch nearest that end of the rod will bring in gear the clutch on that end of the roller, & when in the other notch will set this wheel free & bring the clutch on the other end into gear. An arched piece is secured to the capitals of the upright pieces by which they are connected & strengthened; this arch may be tastefully formed & ornamented to fancy. Appended to these parts & connected with

X 7761 them by the drum shafts, are two rail-ways, or rectangular troughs, with top or ends, resting upon legs ten & one half inches high, with two cross bars to support them. The upper bar is one inch from the top & forms a seat for the bottom of the railway. The other is three & an half inches from the floor: below which the legs turn outwards on each side three inches with feet to secure them to the floor of the mill; these legs & cross bars are one & three quarter inch wide & half an inch thick. & form two frames to support the railways & are placed seven inches inwards from each end of the same. The railway is three & a quarter inches wide on the inside, & three & three quarter inches deep, & three eighths of an inch thick filling the whole space between the top of the posts which project above the upper cross bar. These railways may be of any length required for the number of carding engines to be worked with them on whose battings are to be delivered into them from the back ends of these railways, on each outside & level with the bottom a stand is projected backwards one & three quarter inch & turned downwards so far as will bring the top of the drum whose shaft it sustains level with the bottom of the inside of the railways. These stands are slitted for the bolt which holds them to the rail ways, that they may be extended back-wards & forwards to make taught the endless belt which carries forward the cotton from the carding engines. At those points in these rail ways where the forward edge of the battings from the cards enter them, a groove is made on the inside of each side, of the railways opposite to each other perpendicular to the bottom & half way down from the top, three eights of an inch wide, & a quarter of an inch deep, to hold in place a roller which presses down the cotton to the belt. On the front end of the railway, from the pulley side, a stand simi-lar to those on the back end is projected forwards, in the same manner, & forms the bearing for the pulley end of the drum shaft. Near the ends & top of the sides of the railway a cross is placed shouldered against the sides & passing thro' them are rivetted, they are three fourths of an inch in diameter & polished.

The following parts & pieces with their furnitures as described with those already mentioned constitute this machine. The back drum shafts
are six inches long having on them a drum three & a quarter inches long
& three & a half inches in diameter. A friction roller to each card em-
ployed, three & one eighth inches long & four inches in diameter with
centre pins to suit the grooves in the sides of the railways - Two drum
shafts, eighteen inches long, one & a quarter inch in diameter, having on
the back ends the front drums similar to the back ones, & on the front
ends a cog-wheel of fifty-four teeth - A shaft seven inches long, ha-
ving on the back end a bevel-wheel of forty-four teeth, & on the front
end a pinion of sixteen teeth - An upright shaft twenty-one inches long,
& one & a half inch in diameter with a bevel-wheel at the lower end
of thirty-six teeth & near the top a bevel wheel of forty-four teeth -
A main shaft two feet & one & a quarter inch long having on the
pulley end a loose & fast pulley four & a half inches in diameter &
two inches on the face placed outside of the frame & bearing.
On the inside of the bearing it has a cog-wheel of one hundred &
thirty four teeth, this wheel is loose on the shaft & has on its inside
face, the fixed part of a clutch-box to receive its motion, the sliding
part of this clutch-box is next on this shaft, is four & three quarter
inches in diameter & one & a half inch long, with a neck two and a
half inches in diameter & two & a half inches long, which is grooved
to receive the fork of the lever & the feather or carrier on the surface
of the shaft - This carrier is projected from the shaft one quarter
of an inch, & is two & three quarter inches long & extends from the fixed
part of the clutch-box inwards as far as the sliding part moves
to let the wheel free, where a small shoulder is raised on the shaft
to stop the box from sliding further; near the gear end of this
shaft is a bevel wheel of forty-four teeth. The back drawing roller
of the back drawing head is fourteen & a half inches long, is one inch
in diameter has two fluted bosses, & on the gear end outside of the
bearing, a cog-wheel of thirty-four teeth. The middle roller is six-
teen inches long, & one & a half inch in diameter, has two fluted
bosses & on its pulley end a cog-wheel, of one hundred & fourteen teeth, & on its gear end, a cogwheel of twenty-two teeth - The front roller is fourteen inches long, one & a half inch in diameter, & on its gear end a cogwheel of twenty-two teeth - The lower stud wheel of the back drawing head, has twenty-six teeth, & receives its motion from the middle roller & communicates it to the back roller. The upper stud wheel has thirty-four teeth receives motion from the back roller & communicates it to the front roller. The top rollers, for the back & middle rollers, are twelve & a half inches long, & one inch in diameter, & are covered with leather over the bosses, on the lower rollers, the front top roller of the back drawing head is twelve & a half inches long & one & a half inch in diameter. The stud wheel on the stand between the drawing heads has forty-four teeth & receives motion from the large wheel on the middle roller of the back drawing head & communicates it to the large cog-wheel on the back roller of the front drawing head. This back roller of the front drawing head, is twelve & a half inches long, & one & one eighth inch in diameter, has one fluted boss, & has on its pulley end a cog-wheel of eighty-two teeth, next on this shaft is a clutch one & a half inch in diameter & seven eighths of an inch long, grooved to receive the forks from the sliding rods in the upright pieces, & to slide on a feather or carrier projected from the roller, it is rimmed on the inside face, & the rim is cut into eighteen triangular teeth, having a right angle on the front of the tooth, next on this shaft is a cog-wheel of twenty-four teeth having a rim projecting outwards from the face next the clutch & cut into teeth of the same shape & size having the right angle of the teeth backwards, so that when the clutch is brought up, the teeth will interlock & form a perfect joint with each other, & the wheel being loose on the shaft will be carried by the clutch. next on this shaft & near the gear end is a cogwheel of thirty-two teeth having a toothed rim in all respects like the last described & a similar clutch also moved & governed by the forks from the same sliding rod & so located that the setting one wheel free will always fix the other fast to the opposite clutch. The middle roller of the front

X7761 drawing head, is one foot long & one & a half inch in diameter & has on
the pulley end, a cog-wheel of twenty-two teeth, & on the gear end a like
cog-wheel & has one fluted boss.. The front roller is one foot long & one
& a half inch in diameter & has on its gear end a cog-wheel of twenty-
-two teeth.. The lower stud wheel of the front drawing head has twenty-
-six teeth, & receives motion from the clutch wheel on the back drawing
roller, when the clutch on that end is fast, but when by bringing up the
clutch on the other end this wheel is set free: this stud wheel then takes
its motion from the wheel, on the middle roller, & becomes mover of the
released wheel on the back drawing roller without any effect upon the
other parts of the machinery, excepting that the loose wheel communi-
-cates motion to the upper stud wheel (which has thirty-two teeth) and
by that wheel to the front roller.. The stud wheel on the pulley side
of the drawing head, has twenty-two teeth, receives its motion from the
clutch wheel on the back roller, when the clutch is fast on the pulley
side, & communicates it to the wheel on the pulley end of the middle
roller, but when this clutch is moved back, & the wheel set free, this stud
wheel is motioned by the wheel on the middle roller & becomes mover
of the loose wheel on the back roller without any effect whatever upon
the motion of the rollers.. The delivering rollers are ten inches long & two
inches in diameter, the lower one rests upon its bearings, the upper one
turns in the grooves of its stands, by the friction of the lower roller:.
The circular plate is placed in the projection for it on the back of the
stands of the back drawing head, & two curved guides are screwed to it
back of each boss on the back roller, to guide the slivers from the rail
way to the middle of the bosses. The curved plate is fitted in the pro-
-jections on the back of the stands of the front drawing head, & two curved
guides are screwed to it to unite the two slivers from the back drawing
head, & direct them to the boss on the back roller of the front drawing
head.. The two back top rollers of this front drawing head, are nine
& three quarter inches long, one & one eighth inch in diameter & covered
with leather over the bosses of the lower rollers.. The front top roller
of the front drawing head is nine & three quarter inches long & one

X7761

&a inch in diameter .. The latch to keep the cross rod carrying the
the clutch forks is held to the upright piece by a screw just above
the rod on the back of the outward face of the upright, &is loose on
the screw &extends forwards of the upright for a handle to move it by,
&over the rod, it is fitted to enter the notches &when entered in either
of them will fix the rod firmly, in its position .. A turned knob
or handle is fixed to the middle of this cross rod to slide it by..
.Now all the aforesaid shafts &rollers are to be considered as turned in
their journals to fit their bearings &step ... All the aforesaid wheels
except such as are described as sometimes loose on their shafts, or
denominated stud wheels are to be supposed firmly fixed to their
shafts or rollers .. And all these wheels but those called bevel are to
be considered what is called spur wheels, &except those on the drum
shaft &the pinion that drives them to have sixteen teeth to each
inch of their diameter or in that proportion, &the drum shaft wheel
&their pinion to have eight teeth to the inch, &those called bevel to
have twelve teeth to the inch .... All these parts &pieces being placed
in their several locations - a belt is passed round the drums of each
rail way, of a width to cover the bottom &pass freely between the sides.
The friction rollers are placed on these belts with their centre pins
in their grooves in the sides of the rail ways .. The large wheel
on the main shaft passes thro' an opening in the top plate to the
large wheel above the plate on the middle roller of the back
drawing head .. a belt three and a half inches wide is passed round
the front roller of the front drawing head &the lower delivering roller.
The handle of the lever is moved inwards to fix the clutch box -
The sliding rod to have the latch in the outer notch, to fasten the clutch
wheel on the gear side, place a belt from the moving, power of the mill
round the fast driving pulley &all will be in motion - Place four
cards to work with this machine in suchamanner, that the battings
from their doffers will descend on a tin guide into the rail ways, two
battings in each railway .. These batts will be carried forwards &be
slightly condensed by passing, under the friction rollers to the front

X 7761 of the railways, under the polished rod where it will appear in the form of Slivers as wide as the inside of the rail ways. Raise these slivers & pass them between the guides on the curved plate on the back of the back drawing head, to the bosses of the back drawing rollers. They will be carried through this head & appear in two drawn Slivers, in front of the back drawing head. Unite them here & pass them between the guides on the curved plate on the back of the front drawing head to the boss of the back drawing roller. It will pass this drawing head & be carried on the belt thro' the delivering rollers, in one drawn Sliver & descend to the can by its own gravity. Thus the Cotton from the four cards will be carried by this machinery, to & thro' these drawings heads to the cans without the aid of hands & no attention will be required but to remove the cans when full & replace them with those which are empty, & while all the cards are in motion, & deliver their batts to the rail way, the drawings or sliver will be even & good. —

But suppose one card to be stopped by accident, or to be cleaned. the quantity of Cotton entering the rail-way would be diminished one quarter, & the sliver entering the drawing head would be lessened in the same proportion & would make uneven work in the subse-quent process to the thread, & if the draw or stretch of the heads could not be diminished in the same proportion the cards must all stop causing great loss of time, or the work be ruined. Now to obviate this difficulty, when the end of the bat from the card which has stopped has reached the drawing head, lift the latch on the sliding rod & slide the rod towards the gear side of the machine until the latch enters the other notch the clutch will immediately seize the cog-wheel on the pulley side of the drawing head & at the same instant set free the wheel on the gear side, the clutched wheel will now become driver of the stud wheel on that side that wheel will now give motion to the middle roller, & by the arrangement of the gearing the draw or stretch of the head will be instantly diminished one quarter & the sliver will continue to be delivered to the can of the same thickness or containing the same quantity of cotton in any given

X7761 length as before the card stopped, when this card is again set in motion another may be stopped & cleaned & in like manner until all have been cleaned & set in motion again - When the crop is again slipped to the outer notch by which the clutched wheel is again set free & the first is again clutched & all resumes its first position - (Now to the invention of this rail-way or any of its appendages or to any part of this machinery, or drawing head which has been heretofore used I make no claim whatever - But what I do specifically claim as my invention & improvement, is all that combination & arrangement of machinery, before described by which the amount or quantity of stretch or draw of the head is diminished or increased at pleasure not only as effected by placing, the larger increasing, cog-wheel on the gear end of the back roller of the front drawing head & the smaller or diminishing, cog-wheel on the pulley end, but the order may be reversed & the effect will be the same when properly clutched And I claim this improvement not only, as applicable to this front drawing, head, but also to the back head, or to both heads, & to all drawing, heads on which it may be useful, & not only, as effected by placing, the increasing, & diminishing, cog wheels on the back roller, but on either roller as most convenient - and not only on the proportion described above as suitable for four cards with which I use it, but also as proportioned to any number of cards which can be worked with it or to any difference of drawn, stretch that may be desired -

And I also claim the application of the belt which serves as a carrier for the sliver between the front drawing & delivering rollers.

All which will be more fully illustrated by reference to the appended drawings, Plate No 1. is a perspective view of this machine with four cards represented at work. No 2. shows the end of both drawing heads above the top plate. A. is a section of the wheel on the main shaft which drives the heads. B. is the large wheel on the middle roller of the back drawing head & receives its motion from A. The gear wheels of the rollers on the pulley ends are marked with red ink & those on the gear ends with black ink & the periphery of the rollers are

X7761 marked with dotted circles - C. is the gear wheel on the back roller - D. is the gear - wheel on the middle roller. E. is the gear wheel on the front roller. F. is the lower stud - wheel. G. is the upper stud wheel. The journals of the lower rollers are represented by a. & the journals of top rollers by. b. H. is the circular plates - I. is the roller stands - K. is the projections for the clearing boards - L. is the intermediate wheel & communicates motion to the front drawing head - M. is the driving, wheel on the back roller. N. is the increasing gear wheel. O. is the diminishing gear wheel. P the gear wheels on each end of the middle roller - R. gear wheel on front roller. S is the lower stud wheel - T. is the upper stud wheel. W. is the stud wheel on the pulley side - X. is the carrier belt. Z. the delivering rollers - Plate No. 3. shews the rollers, clutches, gearing, sliding rod & forks of the improved head represented as clutched on the gear side & working with its diminished stretch. 1, is the sliding rod. 2. the forks. 3. the clutches. 4. the clutch wheels. 5. the diminishing wheel. 6 the increasing wheel.

For a full & perfect illustration of which I refer to my model in the Patent office. In testimony that the above is a true specification of my said Improvement as above described, I have hereunto set my hand this 29th day of August 1833.

Witnesses
Henry Schenck
Elisha I. Abel

H. B. Leonard

[illegible]

[5292 words]

[illegible]

[illegible] 10